United States Patent [19]

Cocchiaro et al.

[11] Patent Number: 5,583,537
[45] Date of Patent: Dec. 10, 1996

[54] COMPUTER GRAPHICS SYSTEM HAVING A PAUSE UTILITY FOR INTERACTIVE OPERATIONS

[75] Inventors: Charles Cocchiaro, North Chelmsford, Mass.; Michael E. Kropp, Londonderry; Alexander C. McLeod, Hudson, both of N.H.

[73] Assignee: Wang Laboratories, Inc., Billerica, Mass.

[21] Appl. No.: 232,872

[22] Filed: Apr. 25, 1994

Related U.S. Application Data

[63] Continuation of Ser. No. 771,776, Oct. 4, 1991, abandoned.

[51] Int. Cl.⁶ .................................................. G09G 5/00
[52] U.S. Cl. ........................ 345/115; 345/146; 345/902; 395/326
[58] Field of Search ................................ 345/115, 117, 345/145, 146, 902; 395/156, 157, 159, 155, 161

[56] References Cited

U.S. PATENT DOCUMENTS

| | | | |
|---|---|---|---|
| 4,586,035 | 4/1986 | Baker et al. | 340/706 |
| 4,686,522 | 8/1987 | Hernandez et al. | 340/721 |
| 4,859,995 | 8/1989 | Hansen et al. | 340/710 |
| 4,896,290 | 1/1990 | Rhodes et al. | 340/711 |
| 4,939,507 | 7/1990 | Beard et al. | 340/706 |
| 5,027,291 | 6/1991 | Callahan et al. | 340/709 |
| 5,157,768 | 10/1992 | Hoeber et al. | 345/145 |

FOREIGN PATENT DOCUMENTS

| | | | |
|---|---|---|---|
| 0171663 | 8/1986 | European Pat. Off. | |
| 0190419 | 8/1986 | European Pat. Off. | G06F 3/023 |
| 0230351 | 7/1987 | European Pat. Off. | G06F 1/00 |

OTHER PUBLICATIONS

Book, Donald A. Norman & Stephen W. Draper, "User Centered System Design –New Perspectives on Human-–Computer Interaction", Lawrence Erlbaum Associates, Publishers, 1986, Chap. 12, pp. 243, 263.

*Primary Examiner*—Steven Saras
*Attorney, Agent, or Firm*—Ronald J. Paglierani

[57] ABSTRACT

A pausing and resuming utility in a computer graphics application allows the user to temporarily suspend a user-interactive operation without completing it. The user may resume the operation where it was suspended and continue in the same manner as if it had not been suspended. While the operation is suspended, the user need not maintain the system input device in any particular state and may use a Help function to obtain system operating instructions.

35 Claims, 9 Drawing Sheets

COMPUTER GRAPHICS SYSTEM HAVING A PAUSE UTILITY FOR INTERACTIVE OPERATIONS

RELATED APPLICATION

This application is a continuation of application Ser. No. 07/771,776 filed Oct. 4, 1991 now abandoned.

BACKGROUND OF THE INVENTION

In a computer graphics system, a user may create diagrams, graphs, charts or other drawings on a display to be stored and printed. Data for creating the drawing is provided to the system by the user via an input device such as a keyboard or a mouse or a stylus with tablet. The input device provides a means for manipulating the drawing cursor on the system display and for invoking system functions.

On a keyboard, four "arrow keys" are used to move the cursor up, down, right, or left. If the user wants to move the cursor to the right, he depresses the right arrow key. When the cursor reaches the desired position, the user releases the key.

A mouse is a device which rests close to the system on a flat surface called a mouse pad. Movement of the cursor on the display tracks movement of the mouse along the mouse pad. This tracking may be accomplished by one of several means. These include a rolling ball in the bottom of the mouse which makes contact with the mouse pad and a laser beam emitted from the bottom of the mouse onto a grid of reflective material on the mouse pad. As a result of the tracking, the cursor may be moved on the display by simply sliding the mouse along the mouse pad in the desired direction.

A stylus is a device shaped like a pen which the user holds and moves along a tablet. A grid of sensors under the surface of the tablet detects the movement of the stylus. The cursor on the display tracks this movement of the stylus.

The input device also includes at least one switch which may be activated by the user. The switch is used to invoke the functions of the graphics system. On the keyboard, the switch is the space bar; on the mouse, the switch is a button on the top side of the mouse; and on the stylus, this switch is a button near the user's fingers. Throughout this Specification, where functions are described in relation to a mouse, it is implied that the use of the stylus instead is applicable. Some system functions are invoked by pressing and holding the switch; others are invoked by pressing and releasing the switch or "clicking".

Certain system functions are considered user-interactive operations. These operations require the user to supply some kind of input to complete them. They include drawing various shapes and typing text. One typical means of invoking these operations is to position the cursor over the name of the desired operation in a menu and then click on the name. Then, the mouse or keyboard is used to carry out the operation.

One example of a user-interactive operation is drawing a shape like a rectangle. The first step is to choose the operation from a menu by clicking on the name of the operation. Next, the cursor is moved to the area on the display where the rectangle is to be drawn. The button on the mouse (or space bar on the keyboard) is then pressed and held down. This marks one corner of the rectangle on the display. The mouse is then "dragged" across the mouse pad (or the arrow keys are manipulated) until the cursor indicates the desired location of the opposite corner of the rectangle. The operation is completed when the user releases the button (or space bar).

Typing text is another example of a user-interactive operation. Again, text is selected from a menu by clicking on it. Then, the desired text is typed on the keyboard. When the text is complete, the user clicks on some indicator to end the text operation.

A user-interactive operation cannot be interrupted. When dragging the mouse to draw a shape or when typing text, the operation cannot be suspended temporarily, nor can another system function be invoked. In order to call another system function the interactive operation must first be completed. Generally, when a user attempts to call another system function while performing an interactive operation, one of three things will happen. The application will complete the interactive operation in its present state, it will not allow another operation until the user finishes the operation, or it will abort the operation completely.

SUMMARY OF THE INVENTION

When producing large drawings, long and complicated drawing and text operations are sometimes performed. During these long operations, it occasionally becomes desirable for the user to temporarily pause and then resume where he left off. For example, it may be desirable for the user to call a "Help" utility to receive instructions on how to complete the operation. In graphics systems, neither of these is possible. The user must complete the operation prematurely or incorrectly or he must abort it altogether. In the case of long operations, this can result in much wasted time.

The present invention is a computer graphics system and a method which allow suspending and resuming a user-interactive operation. The operation is performed by the user with an input device. The state of the input device defines input from the user required by the graphics system to perform the operation. While the operation is suspended, the user is not required to maintain the state of the input device as it was before the operation was suspended. He is free to leave the system unattended for an indefinite period and then resume the operation where he left off. When the operation is resumed, the user may complete it in the same way he would have if it had never been suspended.

While performing a user-interactive operation such as drawing a figure or typing text with a mouse or a keyboard, the user may manually pause the operation via an input, for example, invoking help. He may then leave the system unattended, that is, he may release the button on the mouse or release the space bar on the keyboard. This will not affect the interactive operation being performed. He will not be required to complete the operation before pausing, nor will the system abort the operation or complete it for him. When the user wishes to return to the interactive operation, he may manually resume the operation via an input such as in exiting help. Before resuming the operation, the system will prompt the user to return the state of the input device to its state when the operation was paused. That is, he will be required to press and hold the space bar or mouse button if it was depressed when the operation was suspended. Also, he will be required to position the cursor on the display in approximately its position when the operation was suspended. After the user has completed this, the interactive operation will resume.

To allow the operation to be resumed, the first step in suspending the operation is storing the state of the input device in memory. The state of the input device is a collection of data comprising the identity of the input device, i.e., keyboard, mouse, etc., the position of switches, i.e., space bar up or down, mouse button up or down, and the position of the cursor on the display. When the user resumes the operation, the system first recalls this information from memory. The user is then prompted to move the cursor to a target on the display corresponding to the stored cursor position and to activate the space bar or button according to the stored input device identity and switch state. After the user accomplishes this task, he may continue performing the interactive operation where it left off when he paused it.

The present invention has many advantages over prior systems. While performing long and complicated drawing operations, it is often desirable to pause briefly, such as while invoking the help function, and then return to the drawing. In prior systems, pausing was not possible. When interrupting a drawing operation, one of three things happened: (1) the user was prompted by the system to complete the operation before it could be interrupted, (2) the system completed the operation for the user at the point at which the user stopped, or (3) the operation was aborted altogether. In any of these cases, the user lost time fixing what was completed incorrectly or redrawing what was aborted. In the present system, the ability to pause and resume eliminates this lost time.

The present invention also allows the user added flexibility in performing complicated operations and in learning how to use the system. While the operation is suspended, a Help function may be used to instruct the user on the system's functions. When the Help function is invoked, the instructions first displayed provide information pertinent to the interactive operation the user was performing. The user may also use the input device to manipulate the Help function to receive any instructions he needs. So, the user who is not familiar with the operation he is performing may pause to receive instructions for the operation and then complete it without losing what he has done. Thus, the beginning user may learn how to operate the system more quickly because he can get help as he goes. Also, the experienced user can more quickly perform complicated operations without having to remember all their details. He can get help on any system function while he is performing an operation.

DETAILED DESCRIPTION OF THE PREFERRED EMBODIMENTS

Figure 1:
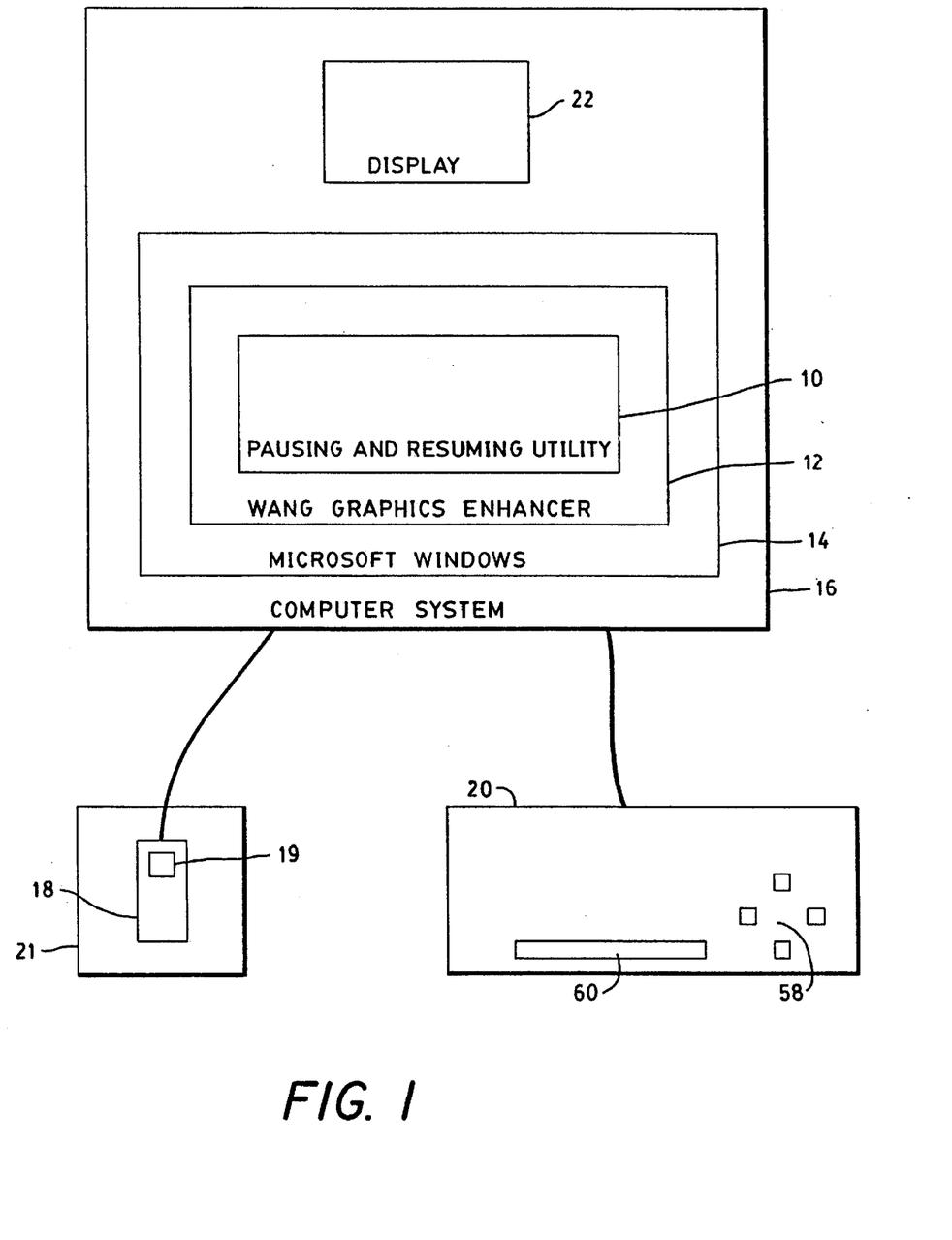
FIG. 1 is a diagram of the preferred embodiment of the present invention.

A preferred embodiment of the present invention (See FIG. 1) is a computer software module 10 running in the Wang Graphics Enhancer graphics application 12. This application runs in the Microsoft Windows environment 14 on a compatible computer system 16. Input to the system 16 from the user is provided via a mouse 18 with mouse button 19 on mouse pad 21 and a keyboard 20 with arrow keys 58 and space bar 60. System information including commands, Help instructions, graphics images created by the user, etc. are displayed on display 22.

Figure 2:
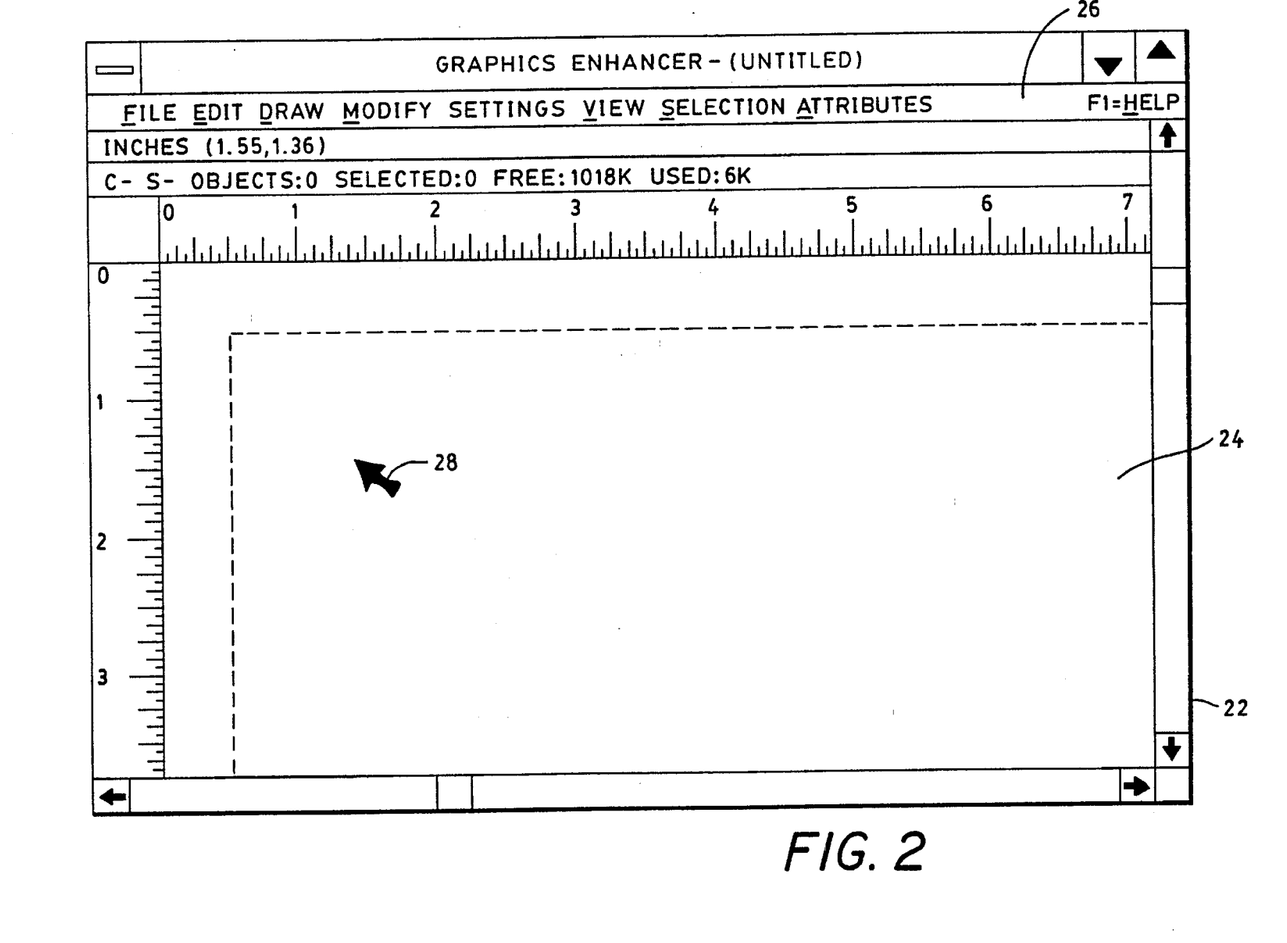
FIG. 2 shows a blank drawing window on the display of the preferred embodiment.

FIG. 2 shows the display 22 when the Graphics Enhancer 12 is running and no operations are being performed. Drawing window 24 is blank except for cursor 28 which can be located anywhere on the display 22 by the user by moving the mouse 18 along the mouse pad 21. Menu 26 lists categories of functions of the Graphics Enhancer 12. To call a function, the user locates the cursor 28 over the desired function category in the menu 26. He then presses and quickly releases, or "clicks", the mouse button 19. Another menu appears on the display 22 which lists the functions available under the selected category. To select a function, the user locates the cursor over the desired function and clicks on it.

If the selected function is not an interactive function, it is executed immediately. Such non-interactive functions include saving and copying files, setting drawing attributes like line thickness, changing text fonts, etc. However, if the function is interactive, the selection procedure only sets up the system so that the function can be performed. These user-interactive functions include drawing and manipulating figures like rectangles, circles, and arcs and typing text. They are considered user-interactive because after they are selected, essential input from the user is required to complete them. For example, in the case of drawing a rectangle, the additional data required to complete the operation is the location on the display of two opposite corners of the rectangle.

The data required for user-interactive operations is supplied by the user via the keyboard 20 in the case of text operations and the mouse 18 for drawing operations. When performing a text operation, the user first selects the "Draw" category from menu 26 and then selects "Text" from the Draw menu as described above. A dialog box then appears on the display 22. The user types the desired text in a field in the box and then clicks on the word "OK" in the box. The dialog box disappears from the display 22 and the cursor 28 changes shape to indicate a text operation is being performed. Using the new cursor 28, the user clicks on the point in the drawing window where the text should begin. The text appears in the drawing window 24 at the desired location, the cursor 28 changes back to its original shape, and the text operation is terminated.

When performing an interactive drawing operation, the user first selects the Draw category from menu 26. He then selects the item to be drawn. As an example, to draw a rectangle, (see FIG. 3) the User selects "Rectangle" from the Draw menu. The first corner 32 of the rectangle 30 is entered by locating the cursor 28 in the desired location in the drawing window 24 and pressing and holding the mouse button 19. The second corner 34 of the rectangle 30 is entered by dragging the mouse 19 along the mouse pad 21 to locate the cursor 28 in the desired location and releasing the mouse button 19. When the mouse button 19 is released, the second and final piece of essential data is entered, the rectangle 30 is completed, and the operation is terminated.

It appears from the above description that these interactive operations must be completed before the user is free to leave the system unattended or to perform another system function. In the case of text operations, the user may simply stop typing but somehow must ensure that the keyboard 20 remains undisturbed to prevent undesired changes in text. When performing a drawing operation, as soon as the user releases the mouse button 19, the drawing is completed and the operation is terminated. However, the present invention provides a means for safely pausing an interactive operation before completing it and resuming the operation where it was paused, without requiring the user to maintain the system in any particular state.

Figure 8:
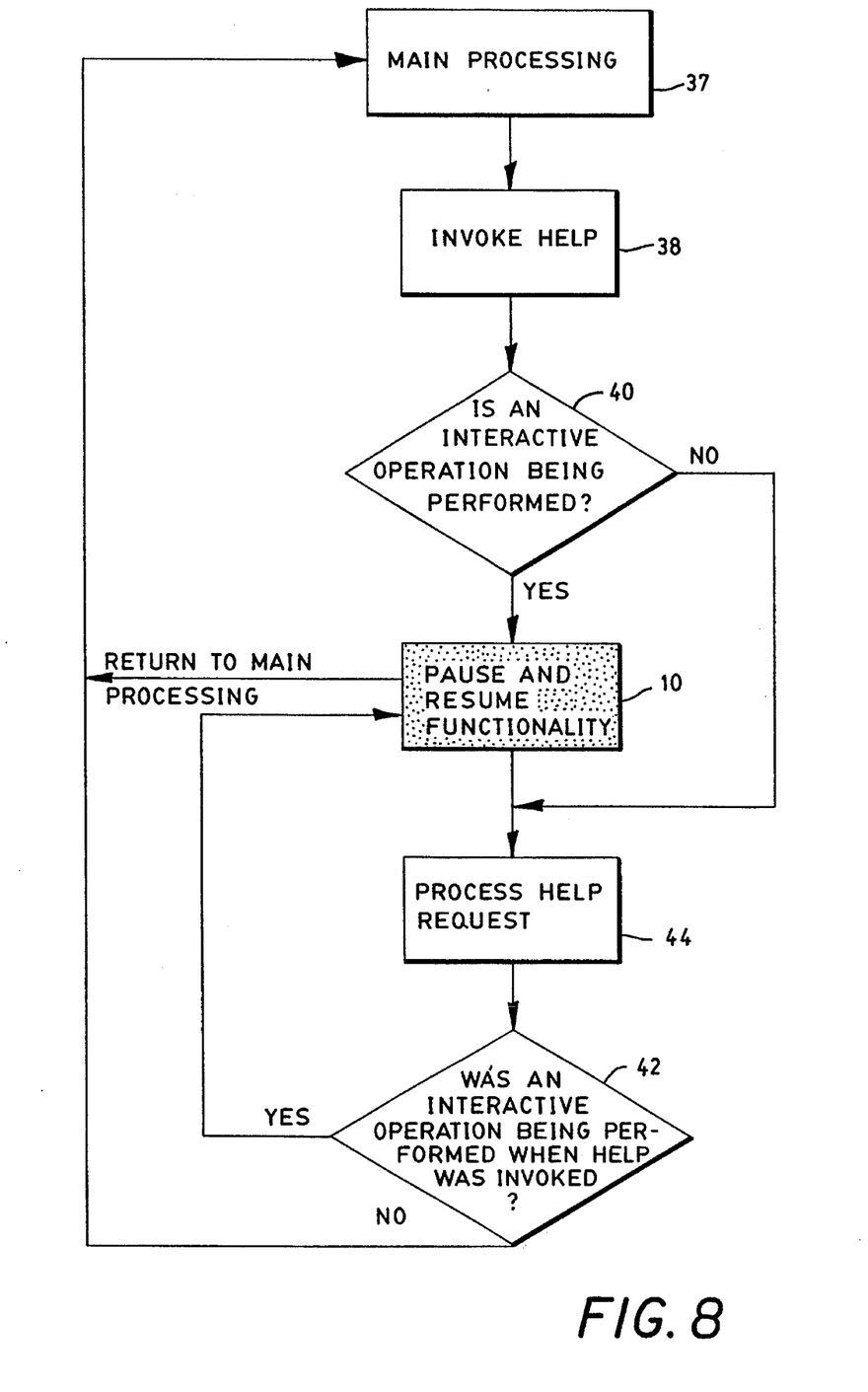
FIG. 8 is a flow chart for processing a Help request in the preferred embodiment.

In the preferred embodiment, this pause and resume utility is initiated by invoking the Help function of the Graphics Enhancer 12. During a user-interactive operation, if the user wishes to pause, he may invoke Help by pressing the software function key F1 on the keyboard 20. The Graphics Enhancer 12 will pause the operation, process the request for Help as it would any other Help request, and resume the operation. FIG. 8 is a flow chart depicting the processing of Help requests in the preferred embodiment. Main Processing 37 of the Graphics Enhancer 12 is interrupted when the user invokes Help 38. A determination 40 is made as to whether an interactive operation was being performed when Help was invoked. If yes, the pause and resume Utility 10 is executed. This utility is comprised of storing mouse information required by the Graphics Enhancer 12 so that the operation may be properly resumed after the Help request is completed. Next, the Help request is processed 44. Before returning to Main Processing 37, a determination 42 is made as to whether an interactive operation was being performed when Help was invoked. If yes, the pause and resume utility 10 is executed again, this time to use the stored mouse information to return the mouse 18 to its state before the Help request. When this is complete, the Graphics Enhancer 12 returns to Main Processing 37. If decisions 40 and 42 indicate that prior to the Help request, no interactive operation was being executed, then the Help request is processed 44 without executing the pause and resume utility 10.

The details of the pause and resume utility 10 of the present invention will be discussed with reference to FIG. 9, a flow chart of the utility, and FIGS. 2–7. They depict the changes in the display 22 when the pause and resume utility 10 is executed during an interactive operation, namely, the drawing of a rectangle.

Figure 3:
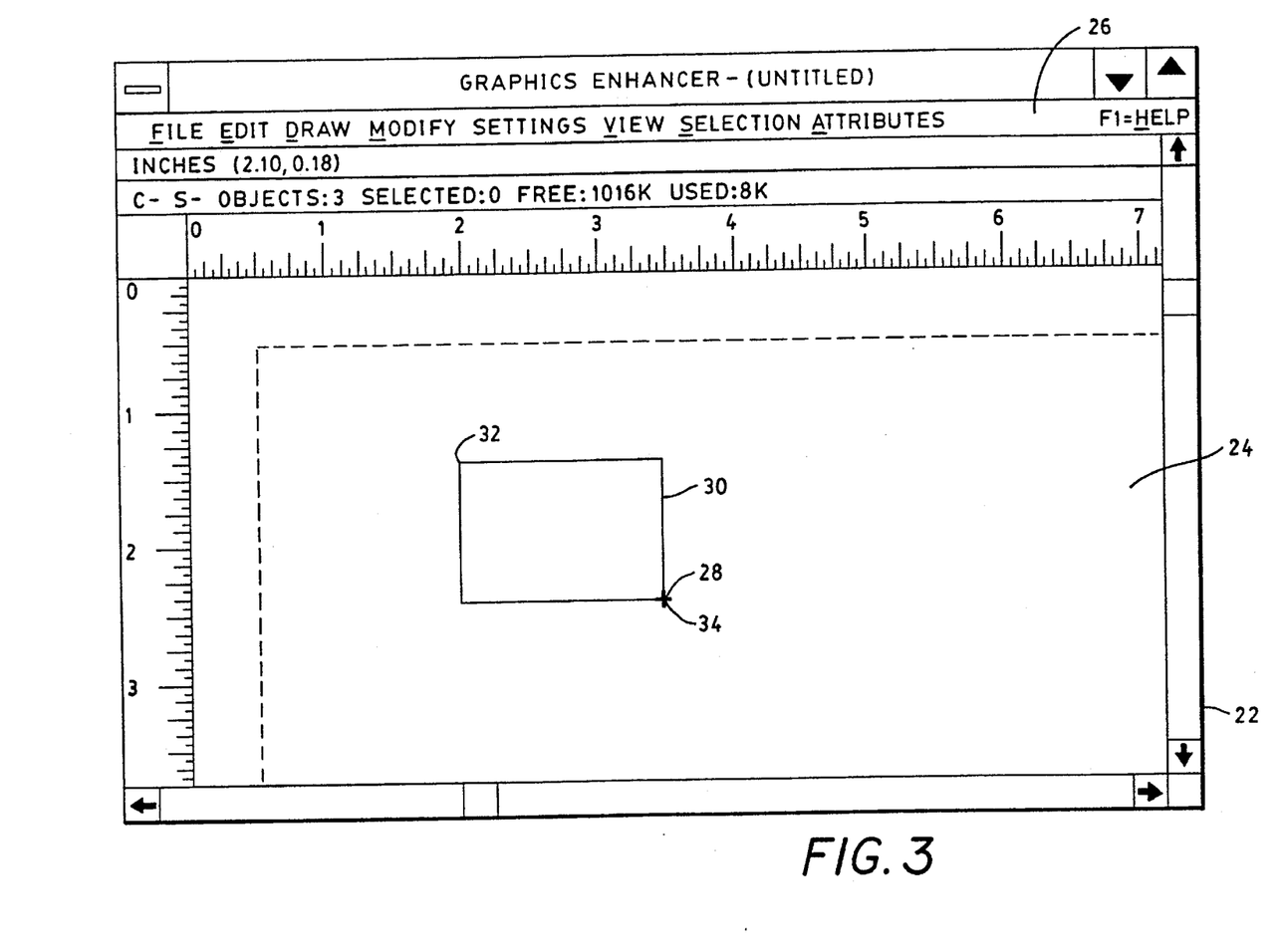
FIG. 3 depicts the drawing window during an interactive operation, namely, drawing a rectangle.

As discussed above, FIG. 2 shows the default state of the display 22. FIG. 3 shows the display while the rectangle 30 is being drawn. The first corner 32 of the rectangle 30 has been entered by the user by pressing and holding the mouse button 19. The cursor 28 represents the second corner 34 being dragged to some location on the drawing window 24 by the mouse 19.

Figure 4:
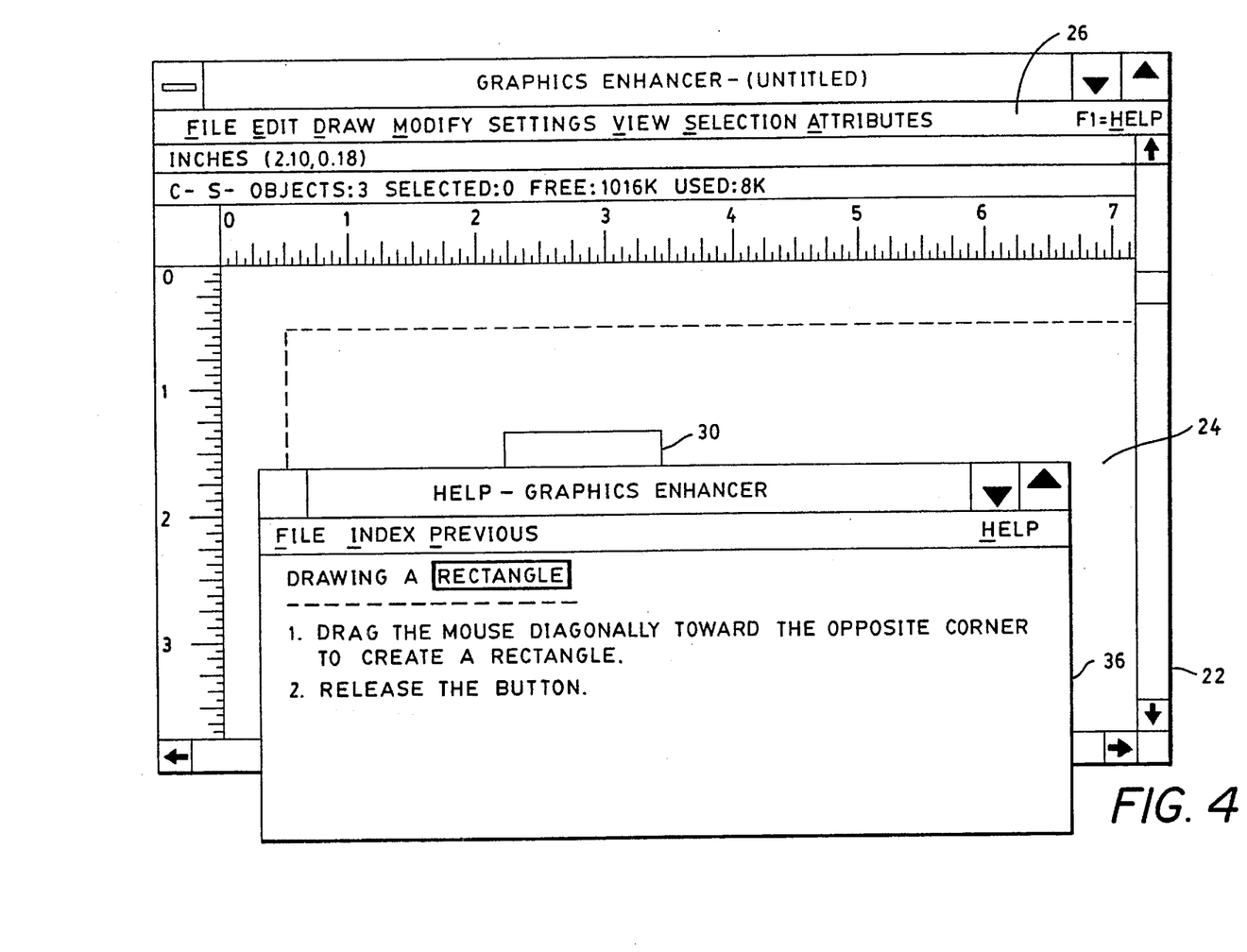
FIG. 4 depicts the display of the graphics system after the interactive operation for drawing a rectangle has been suspended by a request for Help.

The user requests Help by pressing the F1 key. FIG. 4 depicts the state of the display 22 after the request. A Help window 36 appears on the display 22 showing instructions on how to complete the rectangle 30. At this point, the pause and resume utility 10 has paused the rectangle operation and the Help request is being processed. The user is free to move the mouse 18 as he wishes. He may release the mouse button 19 and leave the system 16 unattended. He may also use the mouse 18 to manipulate the Help utility to call other Help instructions to the display 22. These will cause no effect on the rectangle operation, as it has been paused. The user resumes the operation by exiting the Help window 36 to terminate the Help request.

Figure 5:
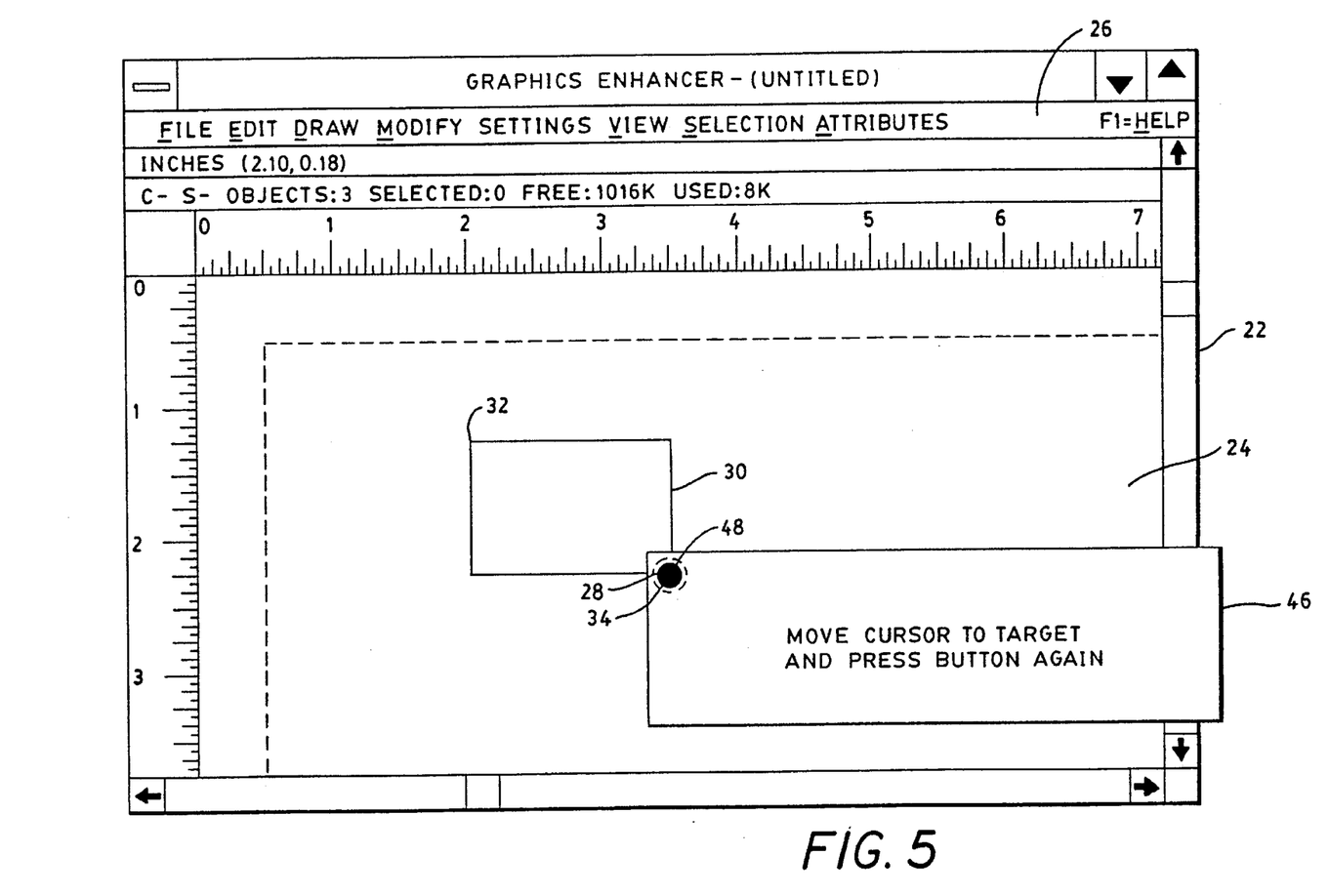
FIG. 5 depicts the system prompting the user to return the state of the input device to its state and position before the Help request.

FIG. 5 shows the display 22 after the Help request is terminated. The pause and resume utility 10 prompts the user to return the mouse 18 to its state when Help was requested. The user must move cursor 28 to cursor target 48. This will ensure that the cursor 28 is again over the second corner 34 of the rectangle 30 when the operation is resumed. The user must then press and hold the mouse button 19 to resume the rectangle drawing operation.

Figure 6:
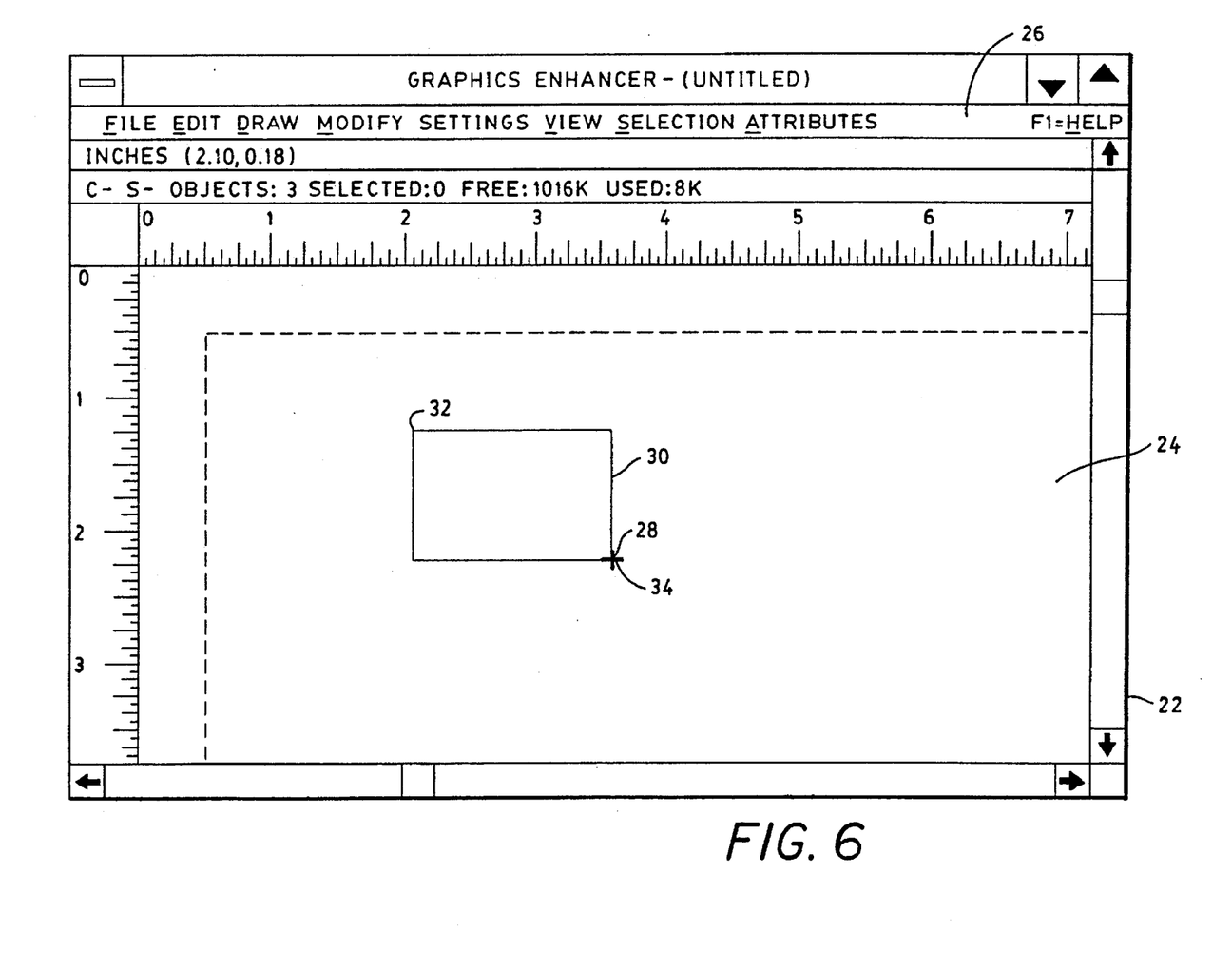
FIG. 6 depicts the display after the rectangle drawing function has been resumed.
Figure 7:
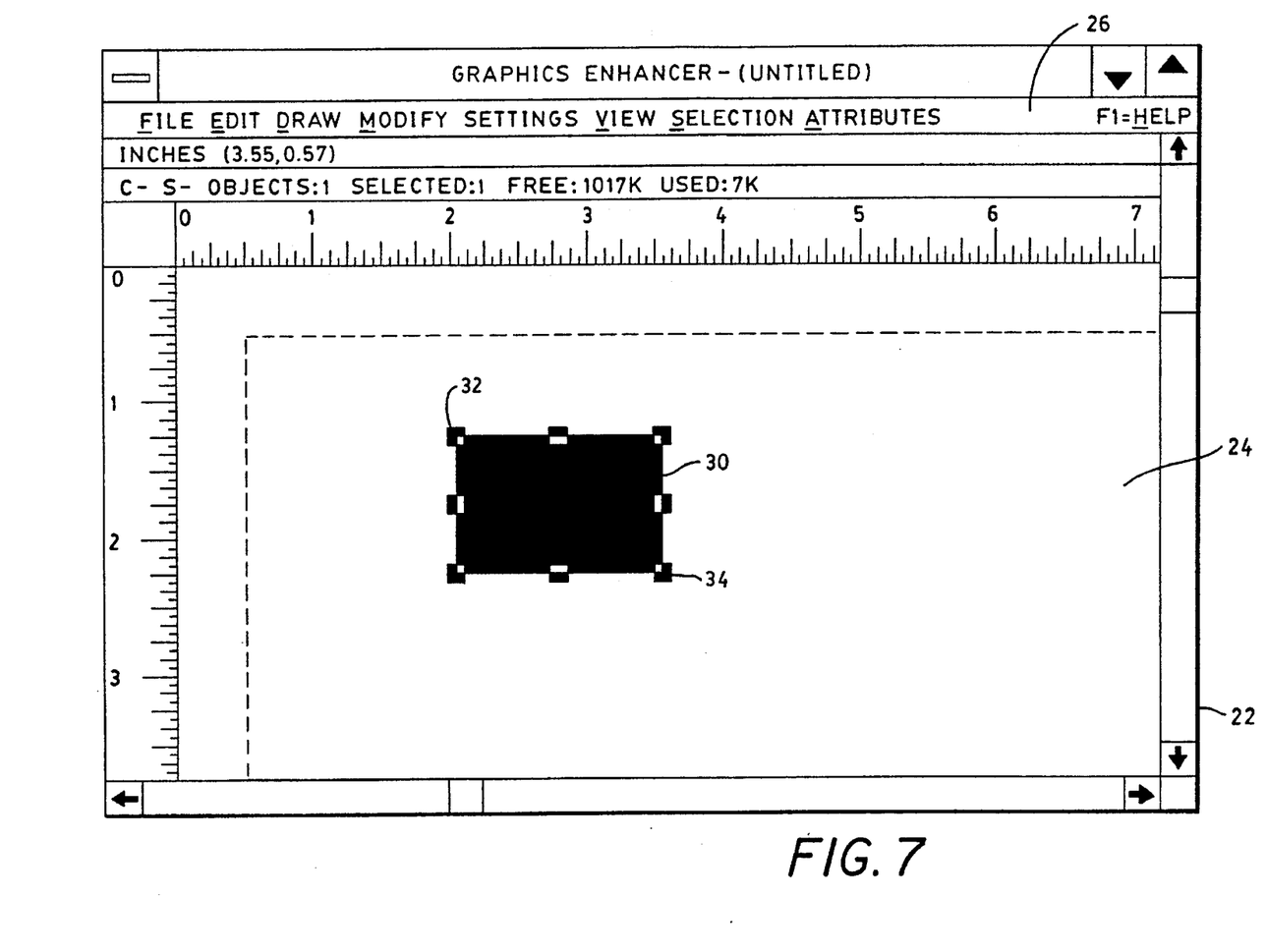
FIG. 7 shows a completely drawn rectangle after the interactive operation is complete.

FIG. 6 depicts the display 22 after the operation has been resumed. The user is holding down the mouse button 19 and is dragging the second corner 34 of the rectangle 30 to the desired location. FIG. 7 shows a completely drawn rectangle 30. The user has released the mouse button 19, completing the rectangle 30 and terminating the operation.

As stated above, the Graphics Enhancer 12 runs under the Microsoft Windows environment 14. Windows 14 is a software package running on a computer system 16 which provides other software applications a graphical user interface in which to operate. Windows 14 accomplishes this via graphical representations called "windows". For example, the Graphics Enhancer drawing window 24 is shown in FIG. 2, and a Help window 36 is shown in FIG. 4.

Windows 14 assigns a "handle" to every window used on the system 16. A handle is simply a name tag which uniquely identifies a window such that when Windows 14 needs to perform a function on the window, it can be found in memory. "Capture" is a Windows 14 variable. It corresponds to the state of the current active window. The window to which Capture corresponds is the only window in which processing may be performed.

Figure 9:
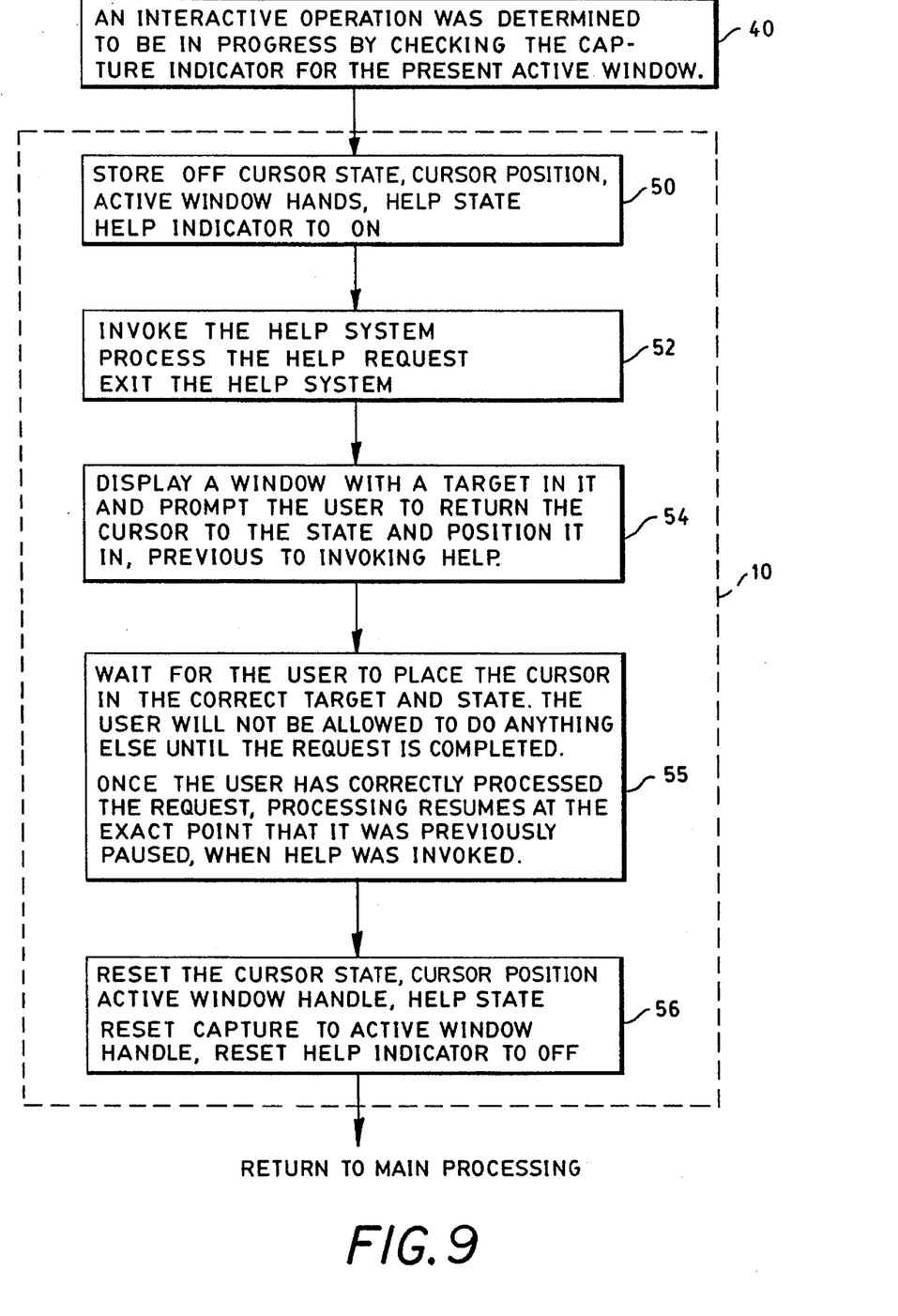
FIG. 9 is a detailed flow chart for the pause and resume utility.

FIG. 9 is a detailed flow chart of the pause and resume utility 10. The Graphics Enhancer 12 enters the utility if, during processing of a Help request, it is determined that an interactive operation was being performed when Help was invoked. As indicated in function box 40, this is done by checking the Capture variable for the handle of the present active window immediately after the request. If the active window has a user-interactive operation in progress, the Graphics Enhancer 12 enters the utility.

The first step 50 in the utility 10 is storing the variables which allow the utility 10 to resume the paused operation. The variables stored are Cursor State, Cursor Position, Active Window Handle and Help State. Cursor State indicates the type of input device being used and the position of switches on the device. For example, it indicates that the input device is a mouse 18 and the mouse button 19 is in the down position. Cursor Position holds the coordinates on the display 22 of the cursor 28. Active window handle is the window in which activity is currently being performed. Help State allows the Graphic Enhancer 12 to display the Help text pertinent to the operation being performed. A Help indicator, a variable which indicates whether Help is being processed, is set to On.

Next, the Help System is invoked 52. The Help Request is processed, and the Help System is exited.

The Graphics Enhancer 12 then begins the process of resuming 54, 55, 56 the interactive operation. A resume prompt window 46 is displayed. The user is required to place the cursor 28 in a cursor target 48 and return the mouse button 19 to its state when Help was invoked. When this is accomplished, the variables Cursor State, Cursor Position, Active Window Handle, and Help State are recalled from memory. Capture is reset to the active window handle, i.e., the window which was active when Help was invoked, and Help indicator is reset to Off. Processing of the interactive operation resumes at exactly the same point where it was paused.

In another embodiment, the keyboard 20 may be used in place of the mouse 18. On the keyboard 20, the space bar 60 serves the same purpose as the mouse button 19 in the foregoing description. Also, arrow keys 58 are used on the keyboard 20 to locate the cursor 28 on the display 22. Instead of dragging the mouse 18 along the mouse pad 21, the user depresses the arrow key which indicates the direction in which he wants to move the cursor 28—up, down, right, or left. With this one noted exception, the foregoing detailed description is applicable to this second embodiment.

While this invention has been particularly shown and described with references to preferred embodiments thereof, it will be understood by those skilled in the art that various changes in form and details may be made therein without departing from the spirit and scope of the invention as defined by the appended claims. For example, the pause may be initiated by other than the Help function. A specific function key may be pressed to cause a pause for any purpose such as processing another task or simply suspending operations.

What is claimed is:

1. In a computer graphics system, a method for pausing while generating an image, generation of the image being commenced by a user providing a first positional input to the computer graphics system via an input device and generation of the image being completed by the user providing a second positional input to the computer graphics system via the input device, the method comprising the steps of:

providing the first positional input to the computer graphics system to commence generation of the image;

before completing generation of the image, suspending generation of the image;

prompting the user to return the input device to an input device condition as it existed prior to the suspending step; and resuming the operation under the same system conditions as existed prior to the suspending step such that generation of the image is continued and can be completed in the same manner as if it had not been suspended.

2. A method as recited in claim 1 wherein parameters defining the input device condition prior to the suspending step are stored by the graphics system while generation of the image is suspended and used during the resuming step to resume the generation of the image where it was suspended.

3. A method as recited in claim 2 wherein the stored parameters comprise:

the identity of the type of input device;

the positions of keys or switches on the input device pertinent to generation of the image; and the position of a cursor on a graphics system display.

4. A method as recited in claim 1 wherein the input device is a mouse.

5. A method as recited in claim 1 wherein the input device is a keyboard.

6. A method as recited in claim 1 wherein, while generation of the image is suspended, another function of the graphics system is performed.

7. A method as recited in claim 6 wherein the function performed while generation of the image is suspended is a Help function which displays instructions for operating the graphics system.

8. A method as recited in claim 9 wherein the instructions selected for display by the Help function pertain to the suspended generation of the image.

9. A method as recited in claim 7 wherein the Help function can be manipulated by the user with the input device to change the displayed instructions.

10. A method as recited in claim 6 wherein the function of the graphics system performed while generation of the image is suspended is performed by the user using the input device.

11. In a computer graphics system, a method for invoking a Help function to display system operating instructions during generation of an image, generation of the image being commenced by a user providing a first positional input to the computer graphics system via an input device and generation of the image being completed by the user providing a second positional input to the computer graphics system via the input device, said method comprising the steps of:

providing the first positional input to the computer graphics system to commence generation of the image;

before completing generation of the image, suspending generation of the image;

performing the Help function;

prompting the user to return the input device to an input device condition as it existed prior to the suspending step; and resuming generation of the image under the same system conditions as existed prior to the suspending step such that generation of the image is continued and can be completed in the same manner as if the Help function had not been invoked.

12. A method as recited in claim 11 wherein, while generation of the image is suspended, the input device condition need not be maintained by the user.

13. A method as recited in claim 11 wherein parameters defining the input device condition prior to the suspending step are stored by the graphics system while generation of the image is suspended and used during the resuming step to resume generation of the image where it was suspended.

14. A method as recited in claim 13 wherein the stored parameters comprise:

the identity of the type of input device;

the positions of keys or switches on the input device pertinent to generation of the image; and the position of a cursor on a graphics system display.

15. A method as recited in claim 11 wherein the input device is a mouse.

16. A method as recited in claim 11 wherein the input device is a keyboard.

17. A method as recited in claim 11 wherein the help instructions selected for display pertain to the suspended generation of the image.

18. A method as recited in claim 11 wherein the Help function may be manipulated by the user with the input device to change the displayed instructions.

19. In a computer graphics system, a method for invoking a Help function to display system operating instructions during generation of an image, generation of the image being commenced by a user providing a first positional input to the computer graphics system via an input device and generation of the image being completed by the user providing a second positional input to the computer graphics system via the input device, said method comprising the steps of:

providing the first positional input to the computer graphics system to commence generation of the image;

storing parameters defining a condition of the input device;

before completing generation of the image, suspending generation of the image upon a request for Help from the user;

processing the request for Help;

prompting the user to return the input device to its condition as it existed prior to the suspending step; and resuming generation of the image under the same conditions as existed prior to the suspending step such that generation of the image is continued and can be completed in the same manner as if the Help function had not been invoked.

20. A method as recited in claim 19 wherein the input device is a mouse.

21. A method as recited in claim 19 wherein the input device is a keyboard.

22. A method as recited in claim 19 wherein the stored parameters comprise:

the identity of the type of input device;

the positions of keys or switches on the input device pertinent to generation of the image; and the position of a cursor on a graphics system display.

23. A computer graphics system comprising:

a display for displaying information required by a user to use the graphics system;

an input device for providing input from the user required by the graphics system to generate an image, generation of the image being commenced by the user providing a first positional input to the computer graphics system via the input device and generation of the image being completed by the user providing a second positional input to the computer graphics system via the input device; and a processor and a program stored in a memory for:

receiving the first positional input from the user to commence generation of the image;

before completing generation of the image, suspending generation of the image, prompting the user to return the input device to an input device condition as it existed prior to the suspending step, and resuming generation of the image under the same system conditions as existed prior to suspending generation of the image such that generation of the image is continued and can be completed in the same manner as if it had not been suspended.

24. A computer graphics system as recited in claim 23 wherein, before suspending generation of the image, the processor and program store in memory parameters defining the input device condition and, while resuming generation of the image, recall the parameters from memory such that generation of the image may be resumed where it was suspended.

25. A computer graphics system as recited in claim 23, wherein the input device is a mouse.

26. A computer graphics system as recited in claim 23, wherein the input device is a keyboard.

27. A computer graphics system as recited in claim 23, wherein the processor and program can perform another system function while generation of the image is suspended.

28. A computer graphics system as recited in claim 27 wherein the function performed while generation of the image is suspended is a Help function in which the processor and program display instructions for operating the graphics system.

29. A computer graphics system as recited in claim 28 wherein while the Help function is performed the processor and program display help instructions pertinent to the suspended generation of the image and allow the user to manipulate the Help function with the input device to change the displayed instructions.

30. A computer graphics system comprising:

a display for displaying information required by a user to use the graphics system;

an input device for providing input from the user required by the graphics system to generate an image, generation of the image being commenced by the user providing a first positional input to the computer graphics system via the input device and generation of the image being completed by the user providing a second positional input to the computer graphics system via the input device; and a processor and program stored in memory for:

receiving the first positional input from the user to commence generation of the image;

before completing generation of the image, suspending generation of the image, performing a Help function to display system operating instructions, prompting the user to return the input device to an input device condition as it existed prior to the suspending step, and resuming generation of the image under the same system conditions as existed prior to suspending generating of the image, such that generation of the image is continued and can be completed in the same manner as if it had not been suspended.

31. A computer graphics system as recited in claim 30, wherein, before suspending generation of the image, the processor and program store in memory parameters defining the input device condition and, while resuming generation of the image, recall the parameters from memory to return the input device to its condition as it existed prior to suspending generation of the image such that generation of the image can be resumed where it was suspended.

32. A computer graphics system as recited in claim 30 wherein while performing the Help function the processor and program display help instructions pertinent to generation of the image and allow the user to manipulate the Help function with the input device to change the displayed instructions.

33. A computer graphics system comprising:

a display with a cursor for displaying information required by a user to use the graphics system;

an input device for providing input from the user required by the computer graphics system to generate an image, generation of the image being commenced by the user providing a first positional input to the computer graphics system via the input device and generation of the image being completed by the user providing a second positional input to the computer graphics system via the input device, a condition of the input device being defined by a collection of parameters comprising the identity of the type of input device, the positions of keys or switches on the input device pertinent to generation of the image, and the position of the cursor on the display; and a processor and a program stored in memory for:

receiving the first positional input from the user to commence generation of the image;

suspending generation of the image before completing generation of the image upon a request for Help from the user, storing the parameters defining the condition of the input device, processing the request for Help, prompting the user to return the input device to the condition defined by the stored parameters, and resuming generation of the image under the same conditions as existed prior to suspending generation of the image, such that generation of the image is continued and can be completed in the same manner as if it had not been suspended.

34. A computer graphics system as recited in claim 33 wherein the input device is a mouse.

35. A computer graphics system as recited in claim 33 wherein the input device is a keyboard.

* * * * *